Nov. 7, 1967     KEIZO SHIMANO     3,351,165
BICYCLE HUB HAVING A BUILT-IN TWO-STAGE SPEED CHANGE MECHANISM
Filed Aug. 17, 1965     5 Sheets-Sheet 3

Nov. 7, 1967 KEIZO SHIMANO 3,351,165
BICYCLE HUB HAVING A BUILT-IN TWO-STAGE SPEED CHANGE MECHANISM
Filed Aug. 17, 1965 5 Sheets-Sheet 4

United States Patent Office 3,351,165
Patented Nov. 7, 1967

3,351,165
BICYCLE HUB HAVING A BUILT-IN TWO-STAGE
SPEED CHANGE MECHANISM
Keizo Shimano, Sakai, Japan, assignor to Shimano Kogyo
Kabushiki Kaisha, Sakai, Japan, a corporation of Japan
Filed Aug. 17, 1965, Ser. No. 480,297
Claims priority, application Japan, Aug. 24, 1964,
39/48,257
1 Claim. (Cl. 192—6)

ABSTRACT OF THE DISCLOSURE

In a bicycle hub is provided a two-speed transmission and a coaster brake. By rotating the sprocket wheel in reverse direction through a limited angle insufficient to actuate the coaster brake, the transmission is shifted from high speed to low speed. Means is provided for preventing reverse rotation of the change over cage, and means is provided for preventing reverse rotation of the clutch cone sleeve. Accordingly, when the sprocket wheel is rotated in reverse direction, change-over from high to low speed occurs particularly rapidly and, also, braking effected by rotating the sprocket sufficiently in the reverse direction also occurs particularly rapidly.

---

This invention relates to a bicycle hub having a built-in two-stage speed change mechanism, including a coaster brake, and is an improvement of the mechanism as mentioned in the specification of Shimano's Patent No. 3,135,368, in which a special power transmission mechanism is arranged in a space within a hub shell, in which not only the normal high speed is obtainable, but also a lower speed may be obtained by rotating a sprocket wheel in reversed direction for a limited angle insufficient for actuating the coaster brake. According to the present invention said speed change mechanism has been greatly improved so that the speed change and braking operation may be more readily and rapidly effected.

Figure 1:
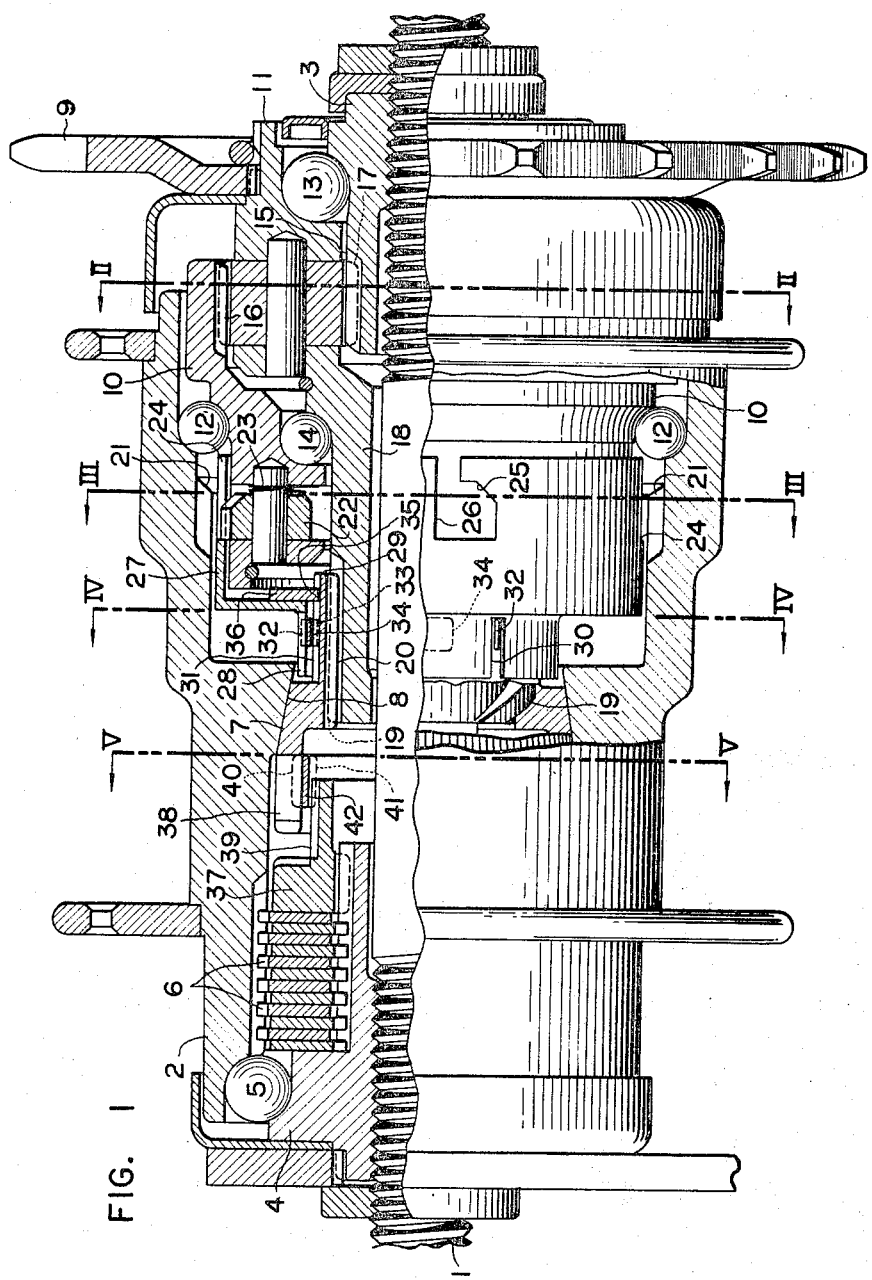
FIGURE 1 shows a rear elevation, partly in section, of a bicycle hub having a built-in two-stage speed change mechanism constructed according to this invention, showing the normal speed position of the mechanism.
Figure 2:
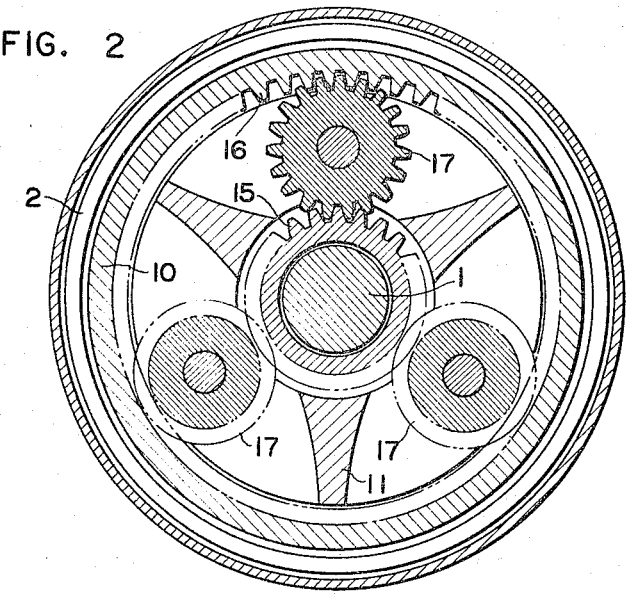
FIGURES 2 to 5 are cross sectional views taken along lines II—II, III—III, IV—IV and V—V, respectively, of FIGURE 1.

Referring to the drawing, the reference numeral 1 designates a rear dead axial of a bicycle having a right hand hub cone 3 and a left hand hub cone 4, on which a hub shell 2 is journalled through ball bearings comprising bearing balls 5, 12, 13 and 14. Within the hub shell 2 there are a plurality of brake discs 6 associated with a clutch cone sleeve 7. This cone sleeve 7 is adapted to be axially slidable to co-operate with a tapered clutch face 8 provided on the inner wall of the hub shell 2. 9 is a sprocket wheel which is so associated with said clutch cone sleeve 7 that clutch sleeve is actuated through an intermediate drum and slid in the direction to produce frictional contact on the co-operating brake discs 6 which are splined, only when said sprocket wheel 9 is rotated in reversed direction for a predetermined relatively large angle, whilst when the sprocket wheel 9 is rotated in the normal direction the clutch cone sleeve 7 is held in frictional contact with the tapered face 8 of the hub shell 2. In this respect, the mechanism is substantially similar in its nature to that found in conventional bicycle hub having a coaster brake.

In the mechanism according to this invention, the single intermediate drum heretofore inserted between the right hand ball bearing and the hub shell is replaced by two parts, one consisting of a stepped outer sleeve 10 and the other consisting of an inner sleeve 11 forming a planetary pinion carrier, and the sprocket wheel 9 is fixed to the latter. The hub shell 2, at the right hand end, is supported by the stepped sleeve 10 through the bearing balls 12. The stepped sleeve 10 is supported by the inner sleeve 11 forming the planetary pinion carrier through the bearing balls 14, and said inner sleeve 11, in turn, is supported by the hub cone 3 through the bearing balls 13. The hub cone 3 is provided with a sun gear 15 meshing with planetary pinions 17 which, in turn, mesh with an internal gear 16 provided on the inner wall of the stepped sleeve 10. The inner sleeve 11 carries the planetary pinions 17. The left hand extension 18 of the inner sleeve or planetary pinion carrier sleeve 11 serves as a clutch control sleeve. Said clutch control sleeve 18 is so associated with the clutch cone 7 that upon the rotation of the sprocket wheel 9 in the normal direction the clutch cone 7 is moved axially to come into engagement with the tapered clutch face 8 of the hub shell 2, through the spiral engagement of the male screw thread 19 on the left hand extension 18 with the female screw thread 20 on the clutch cone sleeve 7. On the other hand, the clutch control sleeve 18 is associated with the stepped outer sleeve 10 which carries the change-over pawls so as to give the latter higher speed upon the rotation of the sprocket wheel 9 in the normal direction, as by means hereinafter to be described.

For attaining direct transmission of high and low speed rotations to the hub shell 2, there are adopted two transmission systems, one consisting of the clutch cone type, and the other consisting of internal ratchet wheel 21 formed on the right hand end portion of the hub shell 2, and a plurality of change-over pawls 22 provided in the pawl carrier sleeve 10, said change-over pawl 22 being biased toward the teeth of the internal ratchet wheel 21 by means of springs 23. Said parts are so arranged that in so far as said change-over pawls 22 are held in engagement with the teeth of the internal ratchet wheel 21, the hub shell 2 is rotated in unison with the pawl carrier sleeve 10 at rotation in the normal direction.

Figure 13:
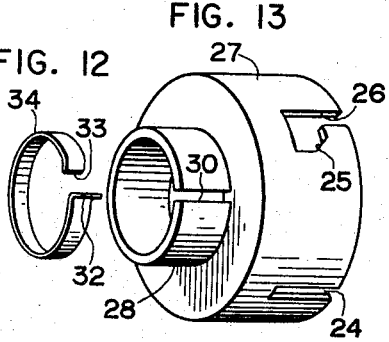
Figure 14:
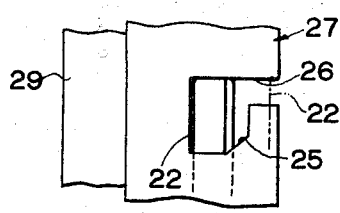
FIGURE 14 shows a detail of a pawl shifter cage.

In order to hold the said change-over pawls 22 in engagement with or disengaged from the teeth of the internal ratchet wheel 21 at the time of change-over of the transmission systems, there is provided an annular shifter cage 27 having a plurality of axial recesses 24 having circumferentially lesser width and a plurality of recesses 26 having circumferentially larger width. Each recess 26 has an inwardly projecting tapered lip 25 on one side thereof, as shown in FIGS. 1 and 13. The shifter cage 27 has a left cylindrical extension or neck portion 28 which fits on the boss 29 of the clutch cone sleeve 7. Upon rotation of the change-over pawl carrier sleeve 10 in the normal direction, the neck portion 28 rotates relative to the boss 29 of the clutch cone 7, while upon rotation of the sleeve 10 in the reversed direction such relative rotation of the neck portion 28 is prevented, during which the clutch cone 7 is actuated by the clutch control sleeve 18 and is axially moved leftwardly toward the brake discs 6. To establish such operation, the neck portion 28 of the cage 27 is provided with an axial slit 30, and the boss 29 of the clutch cone 7 is provided with saw teeth 31. Between the cylindrical neck portion 28 and the saw toothed boss 29 of the clutch cone 7, there is inserted a resilient band 34 which is bent substantially annularly, with one end 32 bent outwardly to form a stop adapted to engage with the slit 30 of the neck portion 28, and the other end 33 is bent inwardly to form a pawl adapted to be in engagement with the saw teeth 31 of the boss 29 of the clutch cone 7. The boss 29 is provided with an annular groove 35 adapted to receive the above mentioned resilient annular band 34.

When the clutch cone sleeve 7 is not to act upon the actuator ring 37 for the brake discs 6, it is axially moved by the rotation of the clutch control sleeve 18 by means of screw thread connection, while only where said clutch control sleeve 18 is rotated in the reverse direction for larger angle than that where it is rotated for changing over the change-over pawls 22, the clutch cone 7 is prevented from rotation in the reverse direction until the same comes into engagement with said actuator ring 37. For the purpose, the left hand end portion of the clutch cone sleeve 7 is provided with an axial slit 38, and the actuator ring 37 is provided with saw teeth 39. Inserted between the left hand end portion of the clutch cone sleeve 7 and the said saw toothed portion 39 of the actuator ring 37, there is an annularly bent resilient band 42, with one end 40 outwardly bent to form a stop adapted to engage with the slit 38, and the other end 41 inwardly bent to form a pawl adapted to engage with said saw teeth 39, the parts being so arranged that the stop 40 is held in engagement with the slit 38 in spite of the axial movement of the clutch cone sleeve 7, and that the pawl 41 tends to be resiliently held in engagement with the saw teeth 39.

Figure 3:
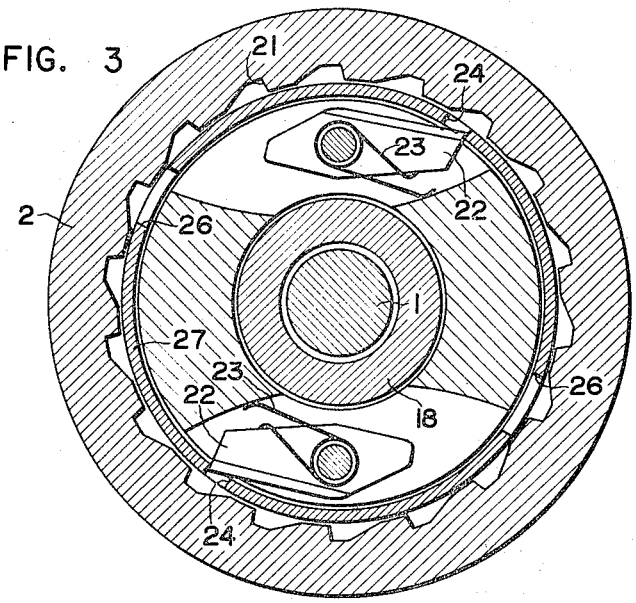
Figure 4:
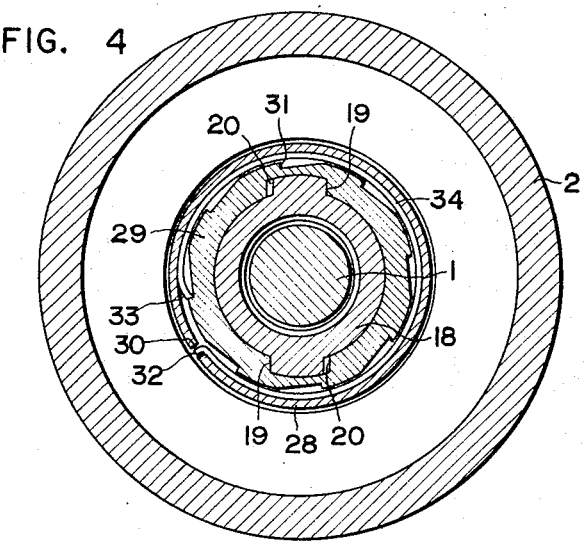
Figure 5:
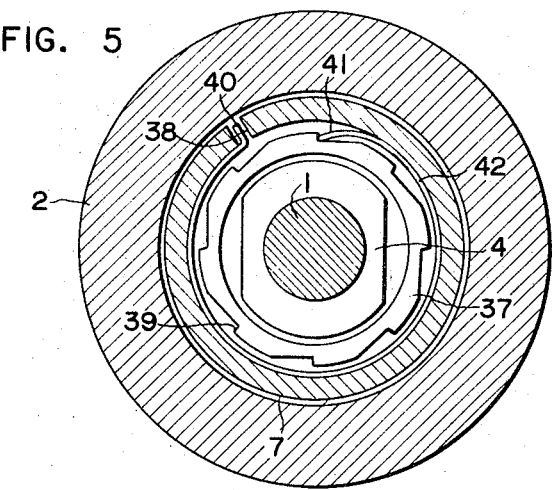
Figure 6:
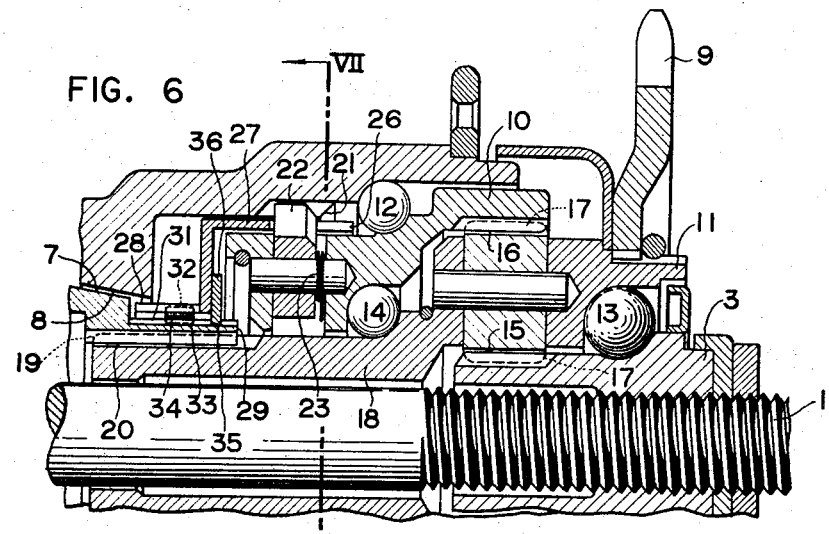
FIGURE 6 is a similar elevation in section of a portion of FIGURE 1, but showing the high speed position of the mechanism.
Figure 7:
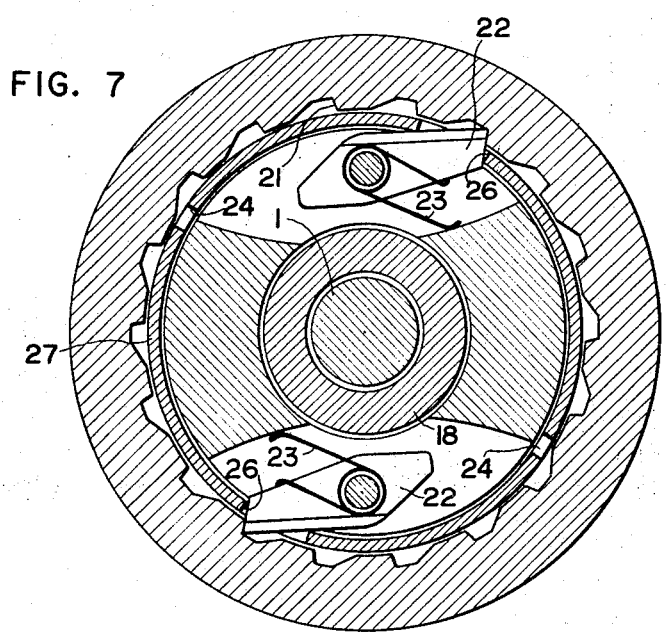
FIGURE 7 shows a cross sectional view taken along line VII—VII of FIGURE 6.
Figure 8:
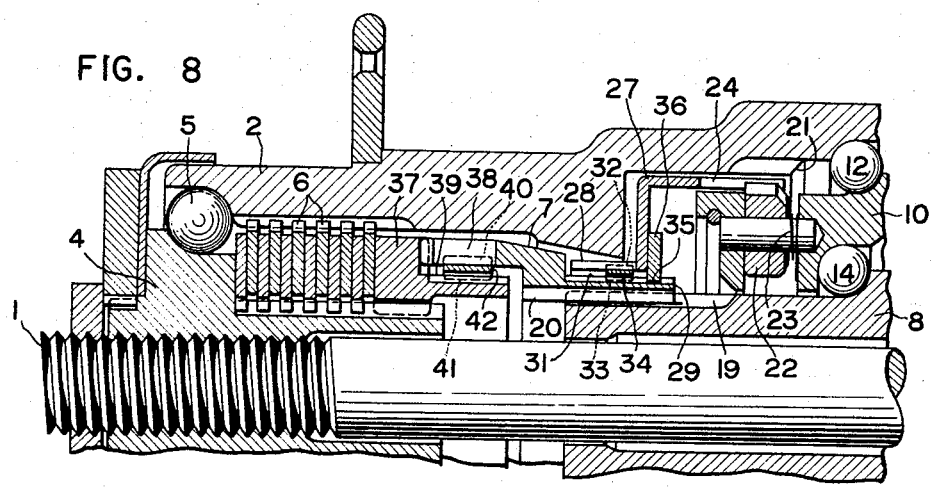
FIGURE 8 shows a longitudinal sectional view of a portion of FIGURE 1 when the brake is operated.
Figure 9:
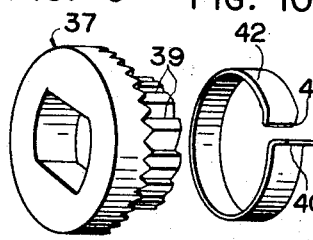
FIGURES 9 to 13 show in perspective views various parts forming a brake control and speed change control mechanism.
Figure 10:
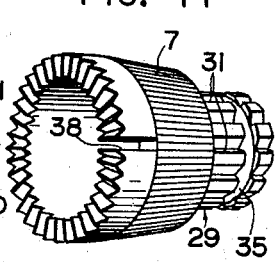
Figure 11:
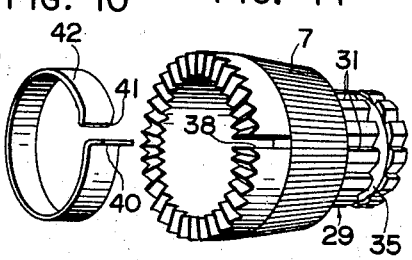
Figure 12:

In FIGURES 1 and 3, the change-over pawls 22 are surpressed by means of the slits 24 of the control cage 27. In this position, when the pawl carrier sleeve 10 is rotated at relatively high speed, thereby moving the clutch cone 7 rightwardly through the clutch control sleeve 18 extending from the planetary pinion carrier sleeve 11 to attain the power transmission at the normal speed. Now, when said pawls 22 are allowed to protrude through the wide slots 26 and to come into engagement with the internal ratchet wheel 21, the power transmission is effected through the change pawl carrier sleeve 10 at relatively high speed.

According to the present invention, within the hub shell 2, in the right hand half thereof, there is provided the speed change mechanism comprising a planetary gear adapted to obtain normal speed same as the speed of rotation of the sprocket wheel 9 as well as the speed higher than the normal speed by readily and effectively actuating the planetary change gear. In the change-over cage 27, means is provided for preventing the reverse rotation thereof comprising the ratchet teeth 31 and the stop pawl 33 engaging therewith. Moreover, in the clutch cone sleeve 7 means is provided for preventing reverse rotation thereof comprising the ratchet teeth 39 and the stop pawl 41 engaging therewith. Owing to the provisions of the above mentioned means, at the time of speed change and braking operation effected by rotating the sprocket wheel 9 in the reverse direction the engaging and disengaging operation of the change-over pawls 22 may be effectively conducted wtihout delay, while the change-over pawl carrier sleeve 10 is retained immovable. Moreover, wtih respect to the braking operation, the axial movement of the clutch cone 7 may be rapidly and effectively conducted while the clutch cone is retained non-rotatable.

What I claim is:

In a bicycle hub having a clutch actuated from a sprocket wheel through a power transmission mechanism by axial movement, a combination comprising a hub shell 2 having an internal tapered clutch face 8 and an internal ratchet wheel 21, a stepped sleeve 10 supporting one end of said hub shell 2 and having an internal gear 16, a planetary pinion carrier sleeve 11 having a sprocket wheel 9 and a cylindrical extension 18 supporting said stepped sleeve 10 and said extension defining a clutch control sleeve, a fixed hub cone 3 having a sun gear 15, a clutch cone 7 adapted to engage with said tapered clutch face 8, a plurality of change-over pawls 22 pivotally mounted in said stepped sleeve 10 operable to engage with said internal ratchet wheel 21 on the hub shell 2, a change-over shifter cage 27 mounted on said clutch cone sleeve 7 and having a plurality of first axial recesses 26 and a plurality of second axial recesses 24, said first recesses being of greater circumferential width than said second recesses and said first and second recesses being alternately arranged circumferentially at intervals, each of said first recesses receiving a respective one of said change-over pawls allowing the latter to engage with the internal ratchet wheel 21 and each of said second recesses being operable to prevent the engagement of the change-over pawls with said internal ratchet wheel, said shifter cage 27 having a cylindrical neck portion 28 mounted on a circumferentially saw toothed extension 29 of the clutch cone sleeve 7 through an anuular band 34 having a stop pawl 33 engaging with the saw teeth of said saw toothed extension 29 for preventing relative rotation of the shifter cage 27 in the reverse direction, a plurality of brake discs 6 which are actuable by axial movement of the clutch sleeve 7 through an actuator 37, the actuator 37 having a saw toothed boss 39 upon which the clutch sleeve 7 is mounted with an annular band 42 having a stop pawl 41 inserted therebetween, the pawl 41 being in engagement with the saw toothed boss 39.

References Cited

UNITED STATES PATENTS

| | | | |
|---|---|---|---|
| 1,704,062 | 3/1929 | Starkey | 192—415 |
| 2,038,063 | 4/1936 | Starkey | 192—415 |
| 2,257,987 | 10/1941 | Starkey | 192—415 |
| 2,615,543 | 10/1952 | Maeser | 192—415 |
| 2,882,755 | 4/1959 | Gleasman | 74—750 |
| 3,022,682 | 2/1962 | Hood et al. | 74—750 |
| 3,135,368 | 6/1964 | Shimano | 74—750 |
| 3,147,641 | 9/1964 | Schwerdhofer | 74—750 |

FOREIGN PATENTS 478,084  10/1951  Canada.

DONLEY J. STOCKING, *Primary Examiner.*

THOMAS C. PERRY, *Examiner.*

J. R. BENEFIEL, *Assistant Examiner.*